United States Patent

[11] 3,603,688

| [72] | Inventor | William Reid Smith-Vaniz<br>Darien, Conn. |
|---|---|---|
| [21] | Appl. No. | 681,476 |
| [22] | Filed | Nov. 8, 1967 |
| [45] | Patented | Sept. 7, 1971 |
| [73] | Assignee | The Perkin-Elmer Corporation<br>Norwalk, Conn. |

[54] ALIGNMENT APPARATUS
6 Claims, 7 Drawing Figs.

[52] U.S. Cl........................................... 356/172,
33/46 AT, 250/220 MX, 331/94.5, 356/152,
356/153
[51] Int. Cl...................................................G01b 11/26
[50] Field of Search............................................356/172,
153, 152, 138; 280/6, 6.1; 33/60, 46 AT; 331/94.5;
250/203, 237, 220 X, 220 G

[56] References Cited
UNITED STATES PATENTS

| 3,496,363 | 2/1970 | Rome........................... | 250/203 |
| 3,528,748 | 9/1970 | Burch et al. ................... | 356/153 |
| 3,532,892 | 10/1970 | Murphy......................... | 356/172 |
| 3,535,525 | 10/1970 | Minkowitz.................... | 356/172 |
| 3,309,621 | 3/1967 | Evtuhov et al................ | 331/94.5 |
| 3,470,377 | 9/1969 | Le Febre et al................ | 356/138 |
| 2,661,653 | 12/1953 | Castiglia........................ | 33/46.2 |
| 2,952,779 | 9/1960 | Talley........................... | 356/152 |
| 3,136,959 | 6/1964 | Culver.......................... | 331/94.5 |
| 3,229,099 | 1/1966 | Schwinghamer et al...... | 356/172 |
| 3,242,439 | 3/1966 | Rigden et al.................. | 331/94.5 |
| 3,279,070 | 10/1966 | Blount et al. ................. | 33/46.2 |

FOREIGN PATENTS

| 1,027,457 | 1966 | Great Britain................ | 250/203 |

OTHER REFERENCES

A. W. Young, Machine Alignment Speeded by Laser, the Iron Age, Vol. 198, Aug. 18, 1966, P. 66.

K. Skutley, Precision Alignment Systems, Civil Engineering-ASCE, Vol. 37, Sept. 1967, pp. 44– 45.

B. Feinberg, Laser Tooling Goes To Work, Tool & Manufacturing Engineer, Vol. 59, Oct. 1967, pp. 52– 56.

Primary Examiner—Ronald L. Wibert
Assistant Examiner—J. Rothenberg
Attorney—Edward R. Hyde, Jr.

ABSTRACT: An alignment apparatus comprises a laser light source and means positioned remotely at a target object including an array of photocells for sensing and indicating displacement of a centroid of an impinging laser beam from a reference point of the array. The laser light source includes means for establishing a beam pattern of contrasting light intensity indicative of the centroid of the beam. An impinging light beam of this character enhances detector sensitivity.

PATENTED SEP 7 1971
3,603,688
SHEET 1 OF 2
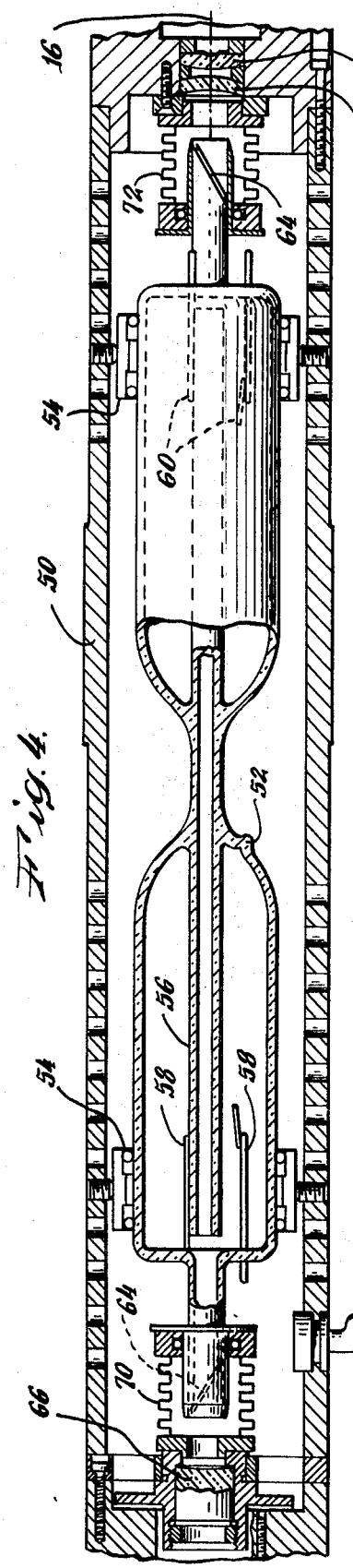
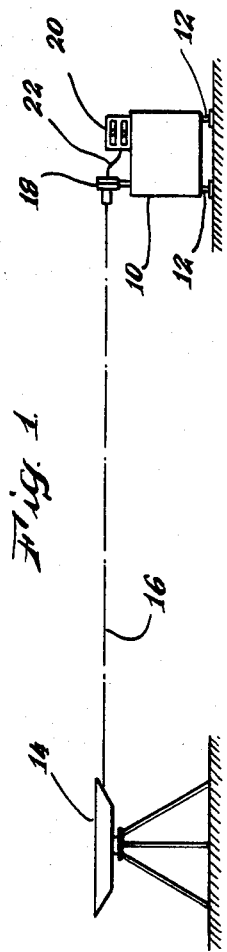
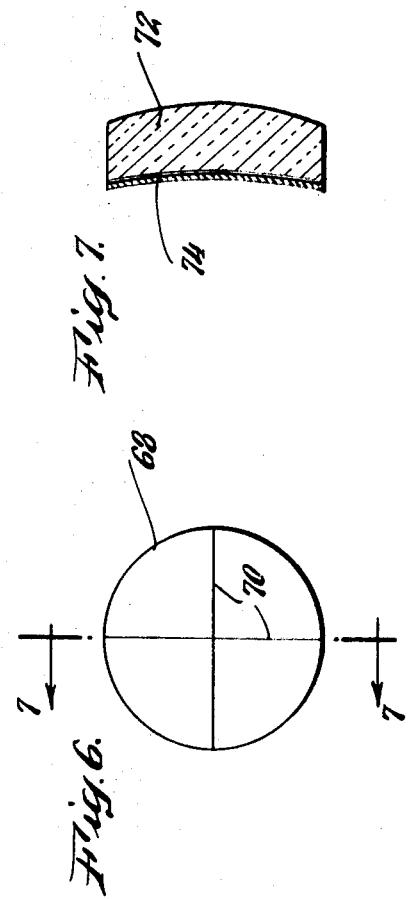
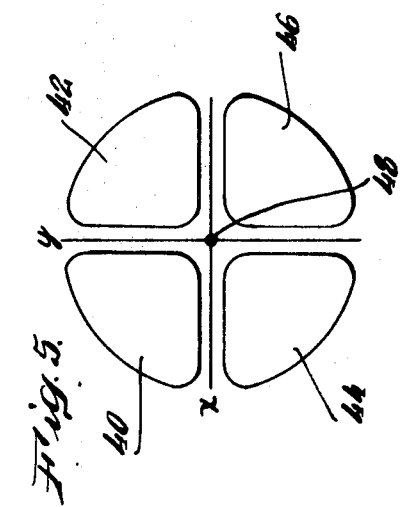
INVENTOR.
William R. Smith-Vaniz
BY
Frank J. Thompson
ATTORNEY.

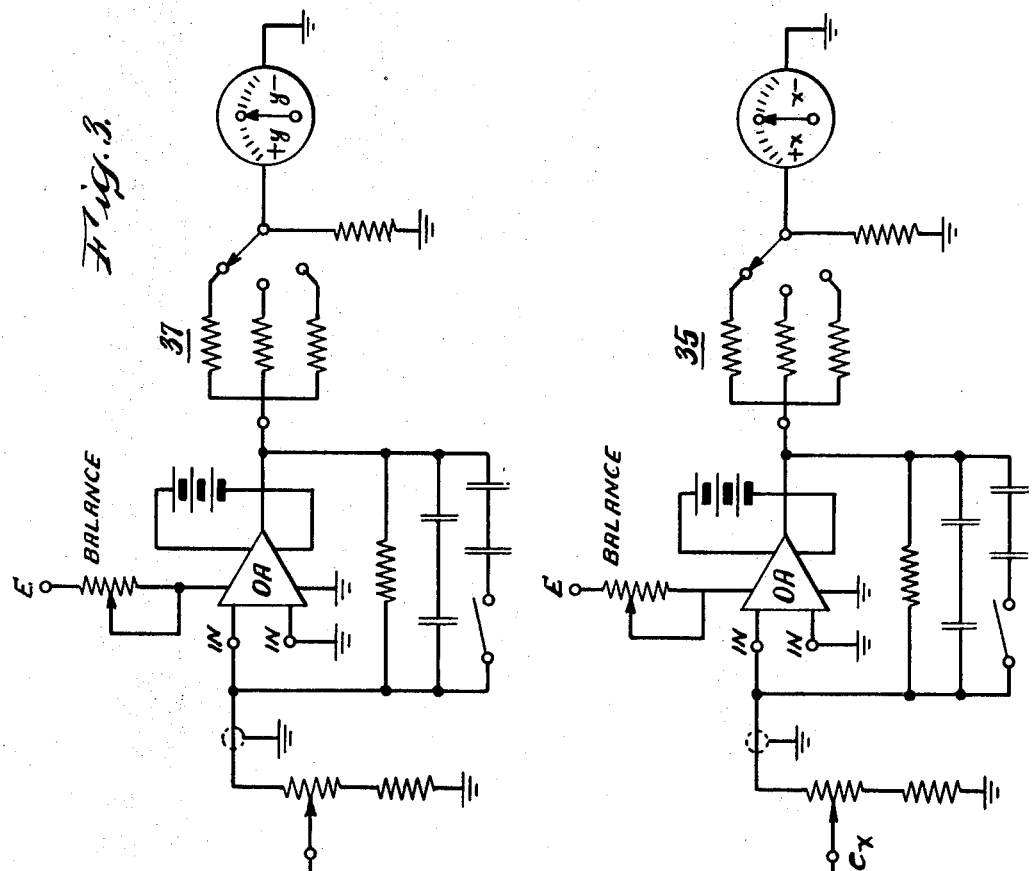
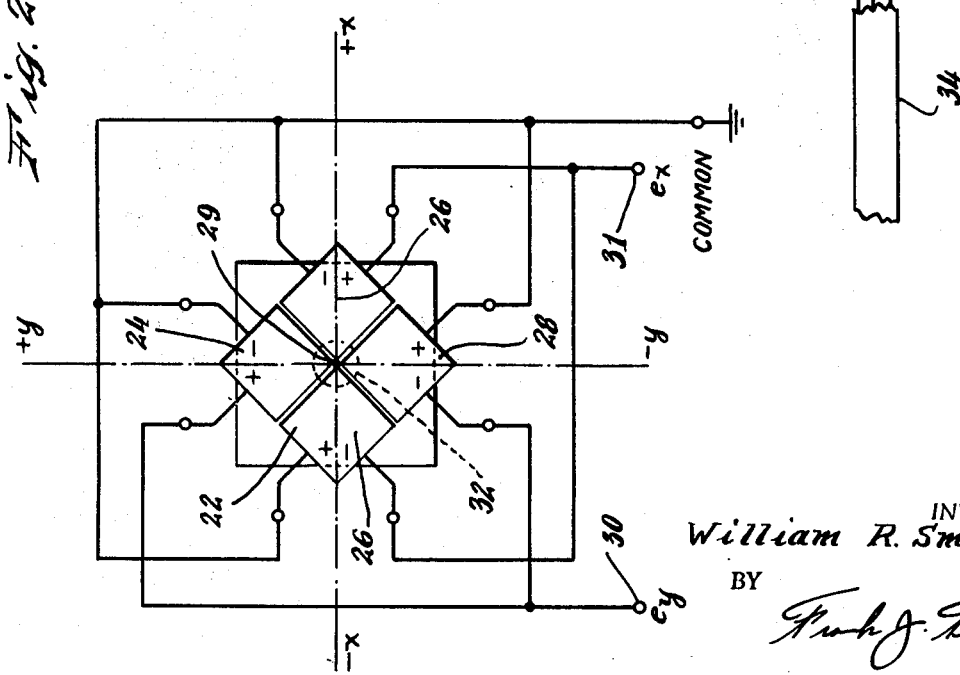

ALIGNMENT APPARATUS

This invention relates to apparatus for aligning a body in space. The invention relates more particularly to alignment apparatus utilizing a laser light beam as a reference line.

In various applications, it is desirable to align a body to a high degree of precision with respect to some reference plane or point. For example, in some tooling alignment operations, alignment of a body with respect to reference point to an accuracy of a few ten-thousandths of an inch is required. The development of the laser light source has rendered possible the projection of an intense relatively narrow beam of light which propagates in rectilinear fashion over relatively large distances and is accompanied by relatively low divergence. This feature of the laser has recommended its use in accurate setup and alignment applications.

One form of laser alignment apparatus utilizes a planar array of photosensitive cells positioned at a target object. A beam from a laser light source is directed at and impinges upon this array. The apparatus is adapted for indicating the direction and magnitude of displacement of a centroid of the impinging laser beam from a reference point of the array in a plane transverse to the direction of propagation of the beam. In particular, a first pair of the cells function as voltage generators and are intercoupled in a series relationship for generating a first electrical voltage representative of the magnitude and direction of the displacement of the beam along one axis in the transverse plane. A second pair of cells are coupled in a similar manner and provide a second electrical voltage representative of the magnitude and direction of displacement of the beam along a second perpendicular coplanar axis. The apparatus is adapted to provide a visual indication of these displacements.

In order that the indication of displacement be highly accurate, it is desirable that the photocells have uniform characteristics. For example, a variation in sensitivity between those photocells indicating displacement along a particular axis will erroneously indicate that the centroid is centered at the reference point although it is slightly displaced. The converse can also occur. The sensitivity of the centering apparatus and the accuracy of alignment is thereby limited. In order to inhibit this result and provide an accurate output indication, the photocells should be carefully selected to assure uniformity in their characteristics. However, the necessary degree of photocell uniformity in order to meet this requirement substantially increases the cost of the detector.

Accordingly it is an object of this invention to provide an improved alignment apparatus including a laser light source and beam apparatus.

Another object of this invention is to provide an alignment apparatus including a laser light source and a beam centering apparatus wherein the laser is adapted for increasing the sensitivity of the centering apparatus.

Another object of the invention is to provide an alignment apparatus including a laser light source and a beam-centering apparatus wherein a high degree of sensitivity is provided yet the beam-centering apparatus employs photocells having presently acceptable uniformity characteristics.

At times, an alignment accuracy less than that provided by the centering apparatus is tolerable. It is then desirable to align a reference point at the target with the laser beam by visual observation of impingement of the beam upon the reference point. An observer alters the target position until coincidence between the reference point and the impinging beam is attained. It would be beneficial in this procedure to provide means for increasing the accuracy of this form of visual alignment.

It is another object of this invention to provide an improved form of laser light source particularly adapted for visual alignment.

A further object of the invention is to provide a laser light source which generates a light beam bearing an index of its centroid.

In accordance with a feature of this invention an alignment apparatus comprises a laser light source and means positioned remotely at a target object including an array of photocells for sensing and indicating displacement of a centroid of an impinging laser beam from a reference point of the array. The laser light source includes means for establishing a beam pattern of contrasting light intensity indicative of the centroid of the beam. An impinging light beam of this character enhances detector sensitivity.

In a particular laser light source, a resonant cavity of the source is adapted for supporting a $TEM_{1,1,n}$ mode and for suppressing lower order modes. A resultant pattern of the laser beam includes a sharply defined cross of zero intensity with respect to a remainder of the pattern. The maximum rate of change of intensity across the pattern occurs at a relatively low intensity enhancing visual alignment and substantially reducing dependence in accuracy of the centering apparatus on cell sensitivity.

These and other objects and features of the invention will become apparent with reference to the following specifications and drawings wherein:

FIG. 1 is a diagram illustrating the general arrangement of a laser light source and centering apparatus constructed in accordance with features of this invention;

FIG. 2 is a schematic diagram illustrating a planar array of photocells utilized in the apparatus of FIG. 1;

FIG. 3 is a schematic diagram of a circuit arrangement for use with the photocell array of FIG. 2;

FIG. 4 is a more detailed diagram of the laser of FIG. 1 illustrating the arrangement of the laser cavity and mode suppressor;

FIG. 5 is a diagram illustrating the cross-sectional beam pattern provided by one embodiment of the laser light source of FIG. 4;

FIG. 6 is a diagram illustrating an embodiment of a mode suppressor for use with the laser of FIG. 1; and, FIG. 7 is a sectional view of the mode suppressor taken along lines 7—7 of FIG. 6.

In FIG. 1, a body 10 which is to be aligned is supported on leveling screws 12 at a position remote from a laser light source 14. The body 10 may comprise a machine tool or workpiece or other body which is to be aligned with a high degree of accuracy. A light beam 16 which is generated by the laser light source represents a reference line for the alignment of the body 10 in a plane transverse to the direction of propagation of the beam. The laser light source is a gaseous type, such as a helium-neon laser, and provides a visible beam 16 having a generally circular cross-sectional pattern with a relatively small diameter, on the order of 10 millimeters. The leveling screws 12 or other similar leveling means or alignment means are adjusted in order to bring a reference point at the body 10 into coincidence with the beam 16. As indicated in greater detail hereinafter, the reference point is represented by the intersection of mutually perpendicular axes in a planar photocell array.

The accuracy of alignment is greatly enhanced by the use of a laser beam centering alignment apparatus positioned at the body 10 comprising a pickup member housing 18 and an indicating member 20. FIG. 2 illustrates a planar array of photocells including the cells 22, 24, 26, and 28 which are mounted in the housing 18 and are positioned in a plane generally perpendicular to the direction of propagation of the beam 16. This plane is represented in FIG. 2 by the plane defined by the X and Y axes. The cells are symmetrically disposed about a reference point 29 and are intercoupled in a manner for providing at output terminals 30 and 31, the voltages $e_y$ and $e_x$ respectively. These voltages exhibit a polarity and amplitude indicative of the direction and magnitude of displacement of the centroid of the impinging laser beam from the point 29 along an associated axis. For example, in FIG. 2 a relatively positive voltage output terminal of the cell 24 and a relatively negative voltage output terminal of the cell 28 are intercoupled while the other terminal of each of these cells is connected to ground potential. When the impinging light beam, represented in FIG. 2 by a circle 32, is displaced from point 29 along the Y axis in the positive direction, for example, a positive output voltage will be established at the terminal 30. As the beam is displaced along the Y axis in the negative direction, a negative output voltage will be established at the terminal 30. Similarly, an output voltage having a magnitude and polarity indicative of displacement along the X axis is provided at the output terminal 31.

The output voltages from terminals 30 and 31 are coupled via a cable 34 to the amplifying and indicating means 20 (FIG. 3) having X and Y channels, 35 and 37, respectively. In FIG. 3, each of the channels is shown to include an operational amplifier and a center reading output meter which is deflected in direction and magnitude to indicate displacement of the beam along an axis. A centering apparatus of this type including the described planar array of photocells and the amplifying and indicating means is disclosed in detail and claimed in copending U.S. Pat. application Ser. No. 612,969, filed on Jan. 31, 1967, now U.S. Pat. No. 3,535,525 and which is assigned to the assignee of the present invention.

In accordance with a feature of the present invention, the beam 16 which is generated by the laser light source 14 is adapted to enhance the sensitivity of the centering apparatus. More particularly, the cross section of the beam 16 includes sharply defined segments of contrasting light intensities. FIG. 5 illustrates the cross-sectional pattern of a light beam in accordance with one embodiment of the present invention. This figure illustrates the pattern of intensity in the $TEM_{11,n}$ mode, in which the E-vector across the beam (in rectangular coordinates) is proportional to $$xye^{-\left[\frac{x^2+y^2}{2R^2}\right]}$$

where $R$ is a constant determining the size of the pattern. The pattern is shown to include pie-shaped segments 40, 42, 44, and 46 of relatively high light intensity, separated by a cross of zero light intensity. A laser light beam having a cross-sectional area with sharply defined contrasting segments in accordance with the invention as in FIG. 5 carries an index of the centroid of the beam. For example, the centroid of the beam illustrated in FIG. 5 is represented generally by the point 48 at the intersection of the crossarms.

The sensitivity of the centering detector to beam displacement is proportional to the light intensity falling on the boundaries between the photocells, while the error signal due to cell mismatch is proportional to the total luminous flux falling on the cells concerned. Thus, the use of a pattern which concentrates on the boundaries while reducing the intensity in the center of the cell offers increased accuracy. In practice, this more than offsets the slightly increased diffraction spreading as compared with a $TEM_{0,0,n}$ mode.

A laser light source adapted for providing an output beam having a cross-sectional area with sharply contrasting segments and bearing an index of a centroid of the beam is illustrated in FIG. 4. The laser source includes a metal casing 50 containing a laser tube assembly 52 which is supported in and spaced from the walls of the housing 50 by rings 54. The tube assembly 52 includes a tube of relatively narrow bore 56 within which the discharge takes place. Suitable electrodes 58 and 60 are provided for initiating and sustaining the discharge by virtue of electrical potentials applied thereto via an electrical input cable 62.

A pair of output windows 64 are disposed at opposite ends of the tube assembly and seal the tubulation at these extremities. The tube assembly confines a gaseous atmosphere, such as helium-neon, adapted for sustaining a discharge in the visible spectrum range. A resonant optical cavity is formed by the tube assembly, a reflective surface 66, and a reflective surface 68. The bellows members 70 and 72 provide for axial movement in order to accurately establish a particular frequency of oscillation by varying the physical length of the optically resonant cavity.

The reflective surface 66, which is spherical and concave, provides substantially 100 percent reflection while the reflective surface 68, which is also spherical and concave, functions as a "dumper" mirror whereby a substantially large portion of the radiant energy is reflected into the cavity while a portion thereof is transmitted axially as an output beam 16. The transmitted beam is passed through an expander lens 74 and then is projected as a laser light beam 16 having a relatively narrow cross section. The general aspects and the theory of operation of a gaseous helium-neon laser are believed to be now well known and further elaboration in this respect is believed unnecessary. An exemplary laser light source of this general type is the Perkin-Elmer Model 5600. In this laser light source, the reflective surfaces 66 and 68 are modified to have radii on the order of 88 and 30 centimeters respectively.

The laser light source of FIG. 4 includes oscillation mode selection means which establish a cross-sectional beam pattern of contrasting light intensity bearing an index of the centroid of the beam. In FIG. 4, these means comprise a dumper mirror 68 having a configuration adapted for interrupting its reflectivity. The dumper mirror 68 is illustrated in greater detail in FIGS. 6 and 7. In FIG. 6, the mirror is shown to have a cross inscribed thereon for interrupting reflections along that area defined by the cross. The dumper includes a substrate 72 formed of optical quality glass and a deposited dielectric reflective material 74. The cross 70 is formed in that surface of the substrate upon which the dielectric material is deposited by scribing lines in mutually perpendicular directions. This arrangement thereby substantially eliminates reflectivity in this area. The scribed dimensions are on the order of 0.0002 inches in width and on the order of 0.0001 inches in depth for a dumper mirror as employed in the Perkin-Elmer Method 5600 laser. This dumper mirror arrangement supports a $TEM_{1,1,n}$ mode and suppresses other lower order modes. Because the suppression occurs in the resonant cavity, the pattern selected by this form of beam interrupter will exist in both the near field and the far field, i.e., that portion of the beam relatively close and relatively remote respectively to the laser source 10.

The laser light source 10 operating in a mode adapted for providing an index of the centroid of the beam in a cross-sectional pattern of the beam is particularly adapted for visual alignment. The observer may align the centroid of the beam and reference point by adjusting the relative position of the object until the reference point and centroid index are successively coincident.

Although means for establishing a particular mode of oscillation for generating an output beam bearing an index of the centroid of the beam has been described, various other modes of oscillation may be provided for attaining the same desired effect.

Thus an alignment apparatus has been described which includes a laser light source and a centering apparatus positioned at the target and having an array of photocells. A cross-sectional pattern provided by the laser light source enhances the sensitivity of the alignment apparatus. Alternatively, the cross-sectional pattern enhances visual alignment.

While I have illustrated and described a particular embodiment of my invention, it will be understood that various modifications may be made therein without departing from the spirit of the invention and the scope of the appended claims.

I claim:

1. An alignment apparatus comprising in combination:
   beam-centering apparatus means including a planar symmetrical array of spaced-apart photocells positioned at a target object for indicating displacement from a reference point of said array of a centroid of a lightbeam impinging thereon;
   said photocells subject to a variation in an output voltage versus input light beam intensity characteristic among the cells of the array;
   a laser light source positioned at a distance from said planar array for projecting a visible light beam at said array;

said laser light source including a means for establishing a symmetrical cross-sectional pattern of sharply defined areas of contrasting light intensity in said light beam for distributing light near the boundaries between said cells and simultaneously reducing the light intensity at the center of each cell relative to the boundary intensity whereby the sensitivity of the alignment apparatus is increased.

2. The alignment apparatus of claim 1 wherein said laser light source includes means for establishing a contrast in beam intensity in a cross-sectional pattern of the projected beam in the near and far fields of the beam.

3. The alignment apparatus of claim 2 wherein said laser light source includes means for establishing a cross in the cross-sectional pattern of said beam, said cross having zero light intensity.

4. The alignment apparatus of claim 3 wherein said laser light source includes means for supporting a $TEM_{1,1,n}$ mode and for suppressing other lower order modes.

5. The alignment apparatus of claim 4 wherein said laser light source includes a resonant cavity having reflective surfaces thereof supporting said $TEM_{1,1,n}$ mode of oscillation and said means for suppressing lower order mode comprises a cross formed on a one of said reflective surfaces.

6. The alignment apparatus of claim 5 wherein one of said reflective surfaces includes a substrate and a dielectric material positioned thereon and said cross is formed in the surface of the substrate.